(12) United States Patent
Christmann

(10) Patent No.: US 11,142,125 B2
(45) Date of Patent: Oct. 12, 2021

(54) CAMERA DEVICE, DRIVER ASSIST SYSTEM, AND VEHICLE

(71) Applicant: Elektrobit Automotive GmbH, Erlangen (DE)

(72) Inventor: Stefan Christmann, Geislingen/Steige (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 168 days.

(21) Appl. No.: 16/668,776

(22) Filed: Oct. 30, 2019

(65) Prior Publication Data
US 2020/0139889 A1 May 7, 2020

(30) Foreign Application Priority Data
Nov. 1, 2018 (DE) .................. 10 2018 218 745.2

(51) Int. Cl.
*B60R 1/02* (2006.01)
*B60R 1/00* (2006.01)
(Continued)

(52) U.S. Cl.
CPC ....... *B60R 1/002* (2013.01); *B60W 30/18009* (2013.01); *G02B 27/0961* (2013.01);
(Continued)

(58) Field of Classification Search
CPC ... B60R 1/002; B60R 2001/1253; B60R 1/00; G02B 27/0961; B60W 30/18009;
(Continued)

(56) References Cited

U.S. PATENT DOCUMENTS

| 5,361,108 A | 11/1994 | Kamata et al. |
| 2009/0040306 A1* | 2/2009 | Foote .................. B60R 1/0602 348/148 |

(Continued)

FOREIGN PATENT DOCUMENTS

| CN | 104071084 | 10/2014 |
| CN | 105473393 | 4/2016 |

(Continued)

OTHER PUBLICATIONS

Office Action (and a German translation) dated Oct. 12, 2020 issued in Japanese Patent Application No. 2019-198520.
(Continued)

*Primary Examiner* — Howard D Brown, Jr.
(74) *Attorney, Agent, or Firm* — Cozen O'Connor

(57) ABSTRACT

A camera device having a first lens forming a first light bundle_B a first sensor arranged within the first light bundle_B, to convert the first light bundle_B, into first image data at least a second lens, forming a second light bundle_B, at least a second sensor arranged within the second light bundle_B to convert the second light bundle_B into second image data. The first sensor and the second sensor are arranged in a common housing. The first sensor is arranged outside the second light bundle_B and the second sensor is arranged outside the first light bundle_B. The first lens and the first sensor and the second lens and the at least second sensor are arranged such that the first light bundle_B and the second light bundle_B overlap at least in part in the housing.

15 Claims, 3 Drawing Sheets

(51) Int. Cl.
  *G02B 27/09* (2006.01)
  *B60W 30/18* (2012.01)
  *H04N 5/243* (2006.01)
  *B60R 1/12* (2006.01)
(52) U.S. Cl.
  CPC ...... *H04N 5/243* (2013.01); *B60R 2001/1253* (2013.01); *B60W 2420/403* (2013.01)
(58) Field of Classification Search
  CPC ............ B60W 2420/403; H04N 5/243; H04N 5/2254; H04N 5/2252; H04N 5/2253; H04N 9/09; G03B 37/04
  See application file for complete search history.

(56) References Cited

U.S. PATENT DOCUMENTS

| | | | | |
|---|---|---|---|---|
| 2010/0002460 | A1* | 1/2010 | Rosenhahn | F21S 41/147 362/521 |
| 2018/0136437 | A1* | 5/2018 | Ono | G03B 9/06 |
| 2018/0136457 | A1* | 5/2018 | Chang | F21V 9/30 |
| 2018/0241944 | A1 | 8/2018 | Uemura | |
| 2018/0365859 | A1* | 12/2018 | Oba | B60R 1/00 |
| 2019/0204845 | A1* | 7/2019 | Grossman | B60R 1/12 |
| 2020/0139889 | A1* | 5/2020 | Christmann | H04N 5/2252 |

FOREIGN PATENT DOCUMENTS

| | | |
|---|---|---|
| CN | 106575358 | 4/2017 |
| CN | 108471488 | 8/2018 |
| DE | 19603094 | 7/1997 |
| DE | 102007028866 | 1/2008 |
| DE | 102011077398 | 12/2012 |
| DE | 102013200427 | 7/2014 |
| DE | 102014210323 | 12/2015 |
| DE | 102015217253 | 3/2017 |
| JP | 2003-285687 | 10/2003 |
| JP | 2018-136487 | 8/2013 |
| JP | 2015-050647 | 3/2015 |
| JP | 2018-136488 | 8/2018 |

OTHER PUBLICATIONS

Office Action dated Feb. 20, 2021 issued in Chinese Patent Application No. 201911051368.X.
Office Action for the corresponding German Patent Application No. 102018218745.2.
Office Action dated Mar. 3, 2019 issued in Japanese Patent Application No. 2019-198520.

* cited by examiner

CAMERA DEVICE, DRIVER ASSIST
SYSTEM, AND VEHICLE

BACKGROUND OF INVENTION

1. Field of the Invention

The invention relates to a camera device comprising a first lens configured to form a first light bundle_B in the case of a first light bundle_A passing therethrough, a first sensor arranged within the first light bundle_B and configured to convert the first light bundle_B, which is impinging on the first sensor, into first image data of the surroundings, at least a second lens configured to form a second light bundle_B in the case of a second light bundle_A passing therethrough, at least a second sensor arranged within the second light bundle_B and configured to convert the second light bundle_B, which impinges on the at least second sensor, into second image data of the surroundings. Moreover, the invention relates to a driver assist system having such a camera device and to a vehicle.

2. Description of Related Art

Various such devices are known. Camera devices are known in which to enlarge a capture area of a vehicle surroundings individual images of multiple individual cameras are combined to form one total image. In this case, it is necessary to use very expensive cameras, by way of example having wide-angle lenses. If such devices are used as mirror replacement systems that must cover a very large field of view (FOV), a lens resolution is generally not sufficient for, by way of example, wide-angle lenses. In addition, wide-angle cameras are encumbered with the disadvantage of considerable image distortions, in particular in their edge regions.

If multiple individual cameras are used, then it is necessary to combine the generated camera images into the total image by an image processing unit in order to cover the required capture area. Such a camera device having multiple individual cameras is also referred to as a surround-view-system. A conventional surround-view-system of a vehicle may comprise by way of example four vehicle cameras that are attached to the vehicle at the front, the rear, on the left-hand side, and on the right-hand side. The total image that has been formed from the individual images may subsequently be displayed to a driver or to a passenger of the vehicle. The driver may be assisted in this manner during a vehicle maneuver, by way of example when reversing the vehicle or during a parking maneuver. The camera images provided by the different vehicle cameras overlap one another typically in one overlapping area.

However, it is not always possible to attach multiple cameras. The use of many individual cameras leads to the conversion of relative movement artifacts in the total image since the images are arranged using so-called look-up tables (in short: LUT) that are only valid for relative camera positions. If the relative camera position changes, the images may no longer be correctly combined with one another.

Document DE 102014210323 A1 discloses a camera device and a method for the adaptive image correction of at least one image parameter of a camera image having multiple cameras for converting camera images, wherein the camera images of adjacent cameras respectively have overlapping image areas; and an image processing unit that combines the camera images generated by the cameras to form a combined total image. The image processing unit comprises an image correction component that for each received camera image calculates multiple average image parameter levels of the image parameter in the overlapping image areas of the camera image and adjusts the respective image parameter in dependence upon the calculated average image parameter levels.

DE 102013200427 A1 discloses a method and a camera device for generating a surround-view image of a vehicle surroundings of a vehicle, having a first vehicle camera for recording a first part-area of the surroundings of a vehicle surroundings and a second vehicle camera for recording a second part-area of the surroundings of the vehicle surroundings that differs at least in part from the first part-area surroundings; at least a first illuminating device for illuminating the first part-area of the surroundings of the vehicle surroundings using electromagnetic radiation in the visible wave length range and/or in the infra-red wave length range and at least a second illuminating device for illuminating the second part-area of the surroundings of the vehicle surroundings using electromagnetic radiation at least in the infra-red wave length range; and a camera device for generating a surround-view image of the vehicle surroundings of a vehicle.

DE 102011077398 A1 discloses a vehicle camera system for providing a seamless image of the vehicle surroundings using one or multiple camera modules that respectively comprise a camera and a local computer. The local computers are each configured to pre-process the images of the vehicle surroundings that are recorded by the allocated camera and said local computers each comprise at least one analogue output for transmitting signals. The vehicle camera system comprises an image fusion unit that is configured so as to generate at least one seamless full image of at least one area of the vehicle surroundings from the pre-processed images of the vehicle surroundings that are transmitted in an analogue manner using the analogue outputs of the local computers.

SUMMARY OF THE INVENTION

An object of one aspect of the invention is an improved and also simplified camera device, an improved driver assist system, and an improved vehicle for capturing image data of the surroundings.

A camera device comprising a first lens configured to form a first light bundle_B in the case of a first light bundle_A passing therethrough, a first sensor arranged within the first light bundle_B, configured to convert the first light bundle_B, which is impinging on the first sensor, into first image data of the surroundings, at least a second lens configured to form a second light bundle_B in the case of a second light bundle_A passing therethrough, at least a second sensor arranged within the second light bundle_B and configured to convert the second light bundle_B, which impinges on the at least second sensor, into second image data of the surroundings.

Within the scope of one aspect of the invention, the first sensor and the at least second sensor are arranged in a common housing, wherein the first sensor is arranged outside the second light bundle_B and the at least second sensor is arranged outside the first light bundle_B, wherein the first lens and the first sensor and also the at least second lens and the at least second sensor are arranged in such that the first light bundle_B and the second light bundle_B overlap in part in the housing.

The term 'lens' may be understood to mean both an individual lens and also an entire lens system, in particular the lens may be configured as a camera lens. By way of example, the lens system may be multiple lenses that have a converging effect and/or a diverging effect and are arranged one behind the other. This applies likewise for the sensor. Thus, by way of example an individual sensor may also be a sensor array.

It is possible by virtue of arranging the first sensor and the at least second sensor in a common housing to reduce the amount of installation space required. As a consequence, the mechanical integration in another component, by way of example in a vehicle component, is simplified. In addition, it is possible to reduce energy consumption and heat emissions. By virtue of arranging the first sensor outside the second light bundle_B and arranging the at least second sensor outside the first light bundle_B, it is avoided that the intersecting light bundles_B interact with one another. It is consequently possible to avoid image artifacts. It is preferred that the light bundles_B are configured as a light cone.

By virtue of connecting the two sensors, it is possible to use a single data transmitting interface so as to transmit the generated image data of the surroundings. The use of a data transmitting interface in the form of an individual cable in lieu of multiple data transmission cables leads to a weight reduction and to a less complicated camera device. A relative movement between the sensors which may lead to a loss of detail or to an incorrect representation of an image is avoided in accordance with one aspect of the invention.

The use of the camera device renders it possible to use multiple different sensors in a common housing. By virtue of one aspect of the invention, the relative position calibration of the lenses and sensors with respect to one another is simplified.

It is preferred that the first lens and the at least second lens are arranged in or on the common housing. By arranging the first and the at least second sensor in the housing and arranging the first lens and the least second lens in or on a single common housing, it is possible to cover different viewing angles/fields of view (FOV) with a simple camera device. It is thus possible to generate a rearward view and a forward view using a single camera device. It is thus possible to forego the use of multiple individual cameras. Moreover, only a single calibration procedure of the camera device is necessary. This saves costs and also time.

In a preferred embodiment, the first lens forms together with the first sensor a first optical axis and the at least second lens forms together with the at least second sensor a second optical axis, wherein the first lens, the first sensor, the at least second lens and the at least second sensor are arranged in such a manner that the first optical axis and the second optical axis intersect one another within the housing.

Advantageously, the first lens faces in a first direction and the at least second lens faces in a second direction which is different to the first direction. As a consequence, it is possible to cover in particular a large field of view/viewing angle.

It is preferred that the first sensor and/or the at least second sensor are configured as a one-dimensional, two-dimensional or three-dimensional image sensor. In this case, it is possible by the one-dimensional image sensor to perform a 1D-measurement by way of example to detect the distance, by the two-dimensional image sensor to perform a 2D-measurement by way of example to detect a two-dimensional object, and by the three-dimension image sensor to perform a 3D-measurement to detect the three-dimensional surroundings. The first sensor and the at least second sensor may be configured identical to one another or differently to one another. It is thus possible, by way of example, for the first sensor and/or the at least second sensor to be configured as a CCD (changed-couple device) sensor and/or as a CMOS (complementary metal oxide semiconductor) sensor and/or as a CIS (contact image sensor) sensor and/or as a DPS (digital pixel) sensor. Such image sensors have a very high lateral resolution. Moreover, the two sensors or one of the sensors may also be configured as a PMD (photonic mixer device) sensor that in addition to the brightness information also detects the distance to objects.

It is advantageous if the first sensor is configured as a first semiconductor component comprising multiple photo-sensitive pixels, and/or the at least second sensor is configured as a second semiconductor component comprising multiple photo-sensitive pixels.

It is preferred that a flexible circuit board is provided. Furthermore, it is preferred that the first sensor and the at least second sensor are arranged on the flexible circuit board. The flexible circuit board having advantageously one or multiple flexible bending portions may be configured as a rigid-flexible or semi-flexible circuit board and may be suitable for SMD placement (surface mounted component). In this case, rigid-flexible circuit boards are understood to be printed circuit boards having rigid and flexible regions; the flexible regions may also be configured by a cable. Semi-flexible circuit boards, also referred to as semiflex circuit boards, are circuit boards having a flexible circuit board portion. Moreover, circuit board attachment elements, so-called mechanical guiding pins, are provided to ensure the flexible circuit board is positioned in or on the housing.

In a preferred embodiment, at least one data transmitting interface is provided for the transmission of the first image data of the surroundings and the at least second image data of the surroundings and it is possible via said data transmitting interface to transmit the first and the at least second image data of the surroundings for further processing outside the housing. The data processing interface may be configured by way of example as an MIPI (Mobile Industry Processor Interface)- or as a POC (Power-Over-Coax) interface.

In one preferred embodiment, a filter is arranged between the first lens and the first sensor and/or a filter is arranged between the at least second lens and the at least second sensor. In particular, the filter may be configured as an IR filter (infra-red filter, infra-red elimination filter) that blocks incoming infra-red light. As a consequence, interfering influences of IR radiation on the image quality of the first sensor and/or of the at least second sensor are avoided.

It is preferred that an electronic evaluating unit is provided in the housing for the first image data of the surroundings and for the at least second image data of the surroundings. The electronic evaluating unit may be used in this case for the data pre-processing of the generated image data of the surroundings. As a consequence, it is possible to reduce the volume of data and thus in achieving this to transmit data more rapidly. It is preferred that the electronic evaluating unit is connected to an interface that is arranged on the housing to transmit the pre-processed image data of the surroundings for further processing outside the housing.

In one preferred embodiment, the first lens, and the at least second lens are arranged fixedly in or on the housing and the first sensor and the at least second sensor are arranged fixedly in the housing. In particular, the lenses may be integrated in the housing, in other words arranged facing inwards, which reduces the additional installation space.

It is preferred that the first lens, the at least second lens, the first sensor, and the at least second sensor are arranged in a rigid manner with respect to one another. Consequently, a relative movement of the individual elements with respect to one another is avoided.

One aspect of the invention is a driver assist system having a camera device as described above.

It is preferred that the driver assist system comprises a computer, which is configured to process the first image data of the surroundings and the second image data of the surroundings to form a total image of the surroundings, and a display device that is configured to display the image of the surroundings. The display device may be by way of example an LED display device and configured so as to represent image data of the surroundings.

Moreover, one aspect of the invention is a vehicle having a driver assist system as described above. In particular, the vehicle is a passenger vehicle.

BRIEF DESCRIPTION OF THE DRAWINGS

Further features, properties and advantages of the present invention emerge from the following description with reference to the attached figures, in which, schematically.

DETAILED DESCRIPTION OF THE PRESENTLY PREFERRED EMBODIMENTS

Although the invention has been described and illustrated in more detail by the preferred exemplary embodiment, the invention is not limited by the disclosed examples. Variations thereof may be derived by the person skilled in the art without departing from the scope of protection of the invention as is defined by the following patent claims.

Figure 1:
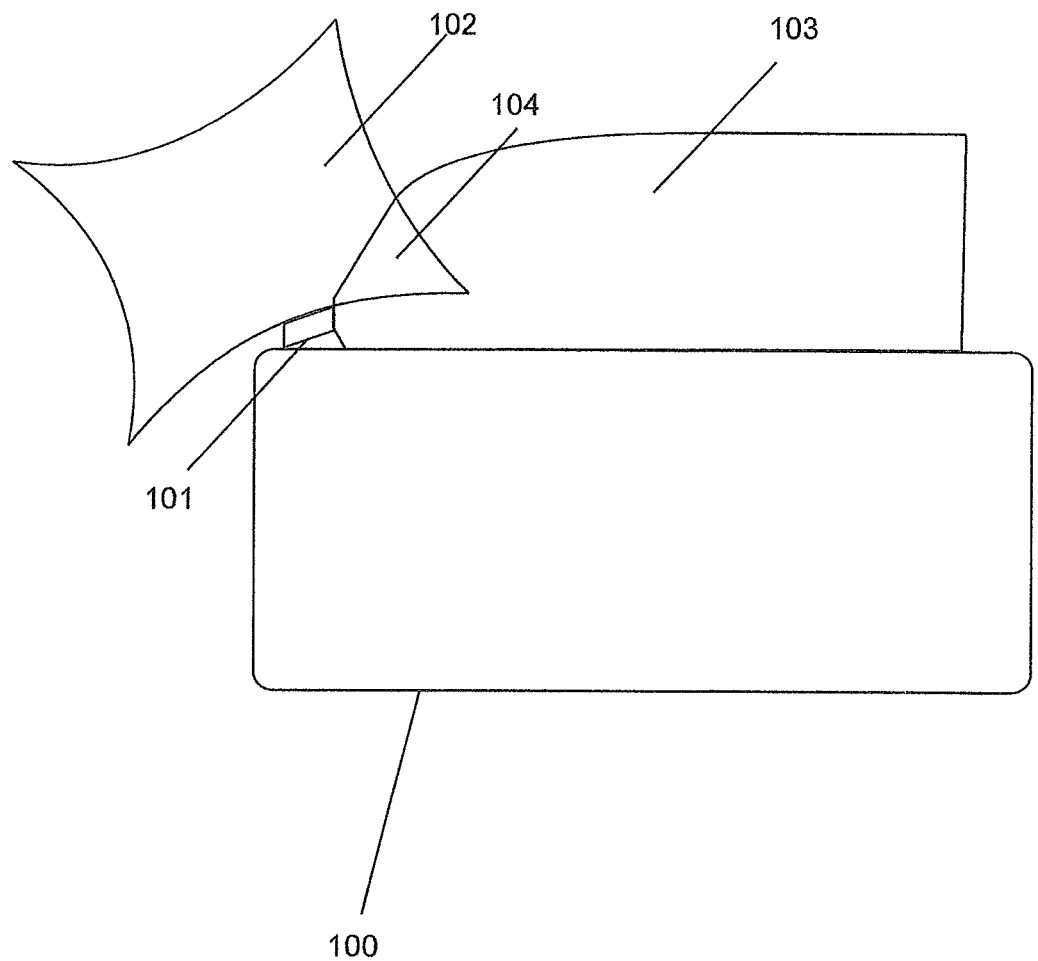
FIG. 1 schematically illustrates a vehicle having a vehicle image system in accordance with the prior art.

FIG. 1 schematically illustrates a vehicle 100 having a vehicle image system for providing a seamless image of a vehicle surroundings in accordance with the prior art. The vehicle image system comprises a first camera and a second camera, which are integrated in this case by way of example in an external mirror 101 in accordance with the prior art. In this case, the second camera may comprise a wide-angle lens. The first camera may be used by way of example to record as the first image data 102 a forward view, in other words an image recording that captures the surroundings in the direction of travel and in part in a side view. The second camera may record as the second image data 103 by way of example a rearward view, in other words an image recording that captures the surroundings in the opposite direction to that of the travel and in part in a side view. In this case, an overlapping area 104 is provided that comprises in part the first image data 102 and also in part the second image data 103. Moreover, the vehicle image system also comprises an evaluating unit that is arranged outside the respective camera. The first image data image data 102 and the second image data 103 are transmitted to the evaluating unit via an interface, which is provided in the respective camera, and converted in the evaluating unit to a total image. This total image may be subsequently displayed to the driver in a display device. If such systems are used as mirror replacement systems, then the resolution of the camera is however often insufficient. In addition movement artifacts occur.

The individual cameras in the vehicle image system must be calibrated prior to use. If a position is mechanically displaced in the case of at least one of the cameras, then it is necessary to perform a new calibration procedure.

Figure 2:
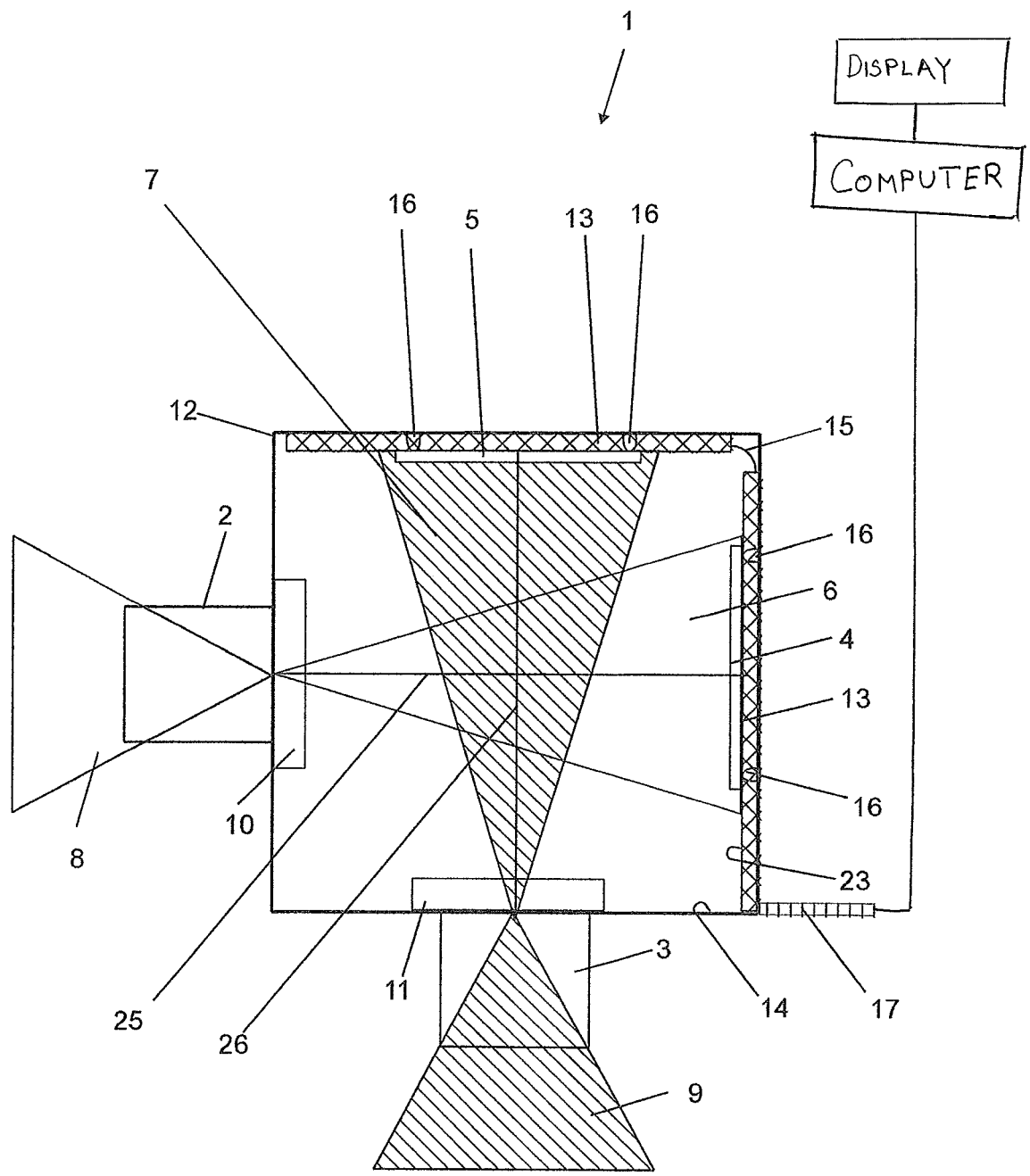
FIG. 2 schematically illustrates a plan view of a first camera device.

FIG. 2 illustrates a camera device 1 in accordance with one aspect of the invention. The camera device 1 comprises a first lens 2 and a second lens 3. Additional lenses may also be provided. Moreover, the camera device 1 comprises a first sensor 4 and a second sensor 5. The first lens 2 is configured to form a first light bundle_B 6 in the case of a first light bundle_A 8 passing therethrough. The second lens 3 is configured to form a second light bundle_B 7 in the case of a second light bundle_A 9 passing therethrough. The first lens 2 is arranged with respect to the first sensor 4 such that the first light bundle_B 6 impinges on the first sensor 4. The second lens 3 is arranged with respect to the second sensor 5 such that the second light bundle_B 7 impinges on the second sensor 5. A first filter 10 that filters out light of a specific wave range is arranged downstream of the first lens 2 preferably in the direction of the first sensor 4. The first filter 10 may be configured as an IR filter (infra-red filter, infra-red elimination filter) that blocks incoming infra-red light. A second filter 11 that filters out light of a specific wave range is arranged downstream of the second lens 3 preferably in the direction of the second sensor 5. The second filter 11 may be configured as an IR filter (infra-red filter, infra-red elimination filter) that blocks incoming infra-red light.

As a consequence, interfering influences of IR radiation on the image quality of the first sensor 4 and also of the at least second sensor 5 are avoided.

The sensors 4, 5 may be configured as light-sensitive sensors (image sensors) that initially convert the light that is impinging on the sensors 4, 5 into voltages that are converted into image data. A conversion unit C is provided for this purpose.

By way of example, the sensors 4, 5 or one of the two sensors 4, 5 may be configured as a CCD (Changed-Couple Device) Sensor and/or as a CMOS (Complementary Metal Oxide Semiconductor)—Sensor and/or as a CIS (Contact Image Sensor)—Sensor and/or as a DPS (Digital Pixel) Sensor. Such image sensors have a very high lateral resolution. Moreover, the two sensors 4, 5 or one of the sensors 4, 5 may also be configured as a PMD (photonic mixer device) sensor that in addition to the brightness information also detects the distance to objects. The sensors 4, 5 may each be of an identical or different type of construction.

The sensors 4, 5 or one of the sensors 4, 5 may also comprise photo diodes that are embodied from silicon. Alternatively, the sensors 4, 5 may also be embodied from a different semiconductor material.

The lenses 2, 3 are arranged on the housing 12. The lenses 2, 3 may face in different directions so as to record an image, in other words to record different images. However, these recorded images may also correspond in part or fully.

The sensors 4, 5 are arranged in a housing 12. The first sensor 4 is arranged outside the second light bundle_B 7, in other words light of the second light bundle_A that passes through the second lens 3 does not impinge on the first sensor 4.

The second sensor 5 is arranged outside the first light bundle_B 6, in other words light of the first light bundle_A that passes through the first lens 2 does not impinge on the second sensor 5.

The first lens 2 forms together with the first sensor 4 a first optical axis 25. The second lens 3 forms together with the second sensor 5 a second optical axis 26. The first sensor 4 and the second sensor 5 and also the first lens 2 and the second lens 3 are arranged in such a manner that the first optical axis 25 and the second optical axis 26 intersect with the housing 12. This means that the first beam path 6 and the second beam path 7 overlap in part inside the housing 12.

The sensors 4, 5 and also the lenses 2, 3 are respectively placed in an orthogonal manner with respect to one another.

As a consequence, it is ensured in a particular simple manner that the light of the first light bundle_B 6 does not impinge on the second sensor 5 and that the light of the second light bundle_B 7 does not impinge on the first sensor 4.

A first metal layer is provided between the housing 12 and the first sensor 4 with the result that the first sensor 4 is connected to the first metal layer in an electrically conductive manner. It is preferred that the first metal layer is configured as a flexible circuit board 13. Consequently, it is possible to economize on the costs for conventional connecting material, by way of example cables or plug-in connectors that are required between two rigid circuit boards. In addition, reliability is increased in comparison by way of example to a cable or plug-in connector for connecting circuit boards. Furthermore, the flexibility facilitates the assembly procedure and the integration in the housing 12.

A second metal layer is provided between the housing 12 and the second sensor 5 with the result that the second sensor 5 is connected in an electrically conductive manner to the second metal layer. It is preferred that the second metal layer is the flexible circuit board 13.

Consequently, the entire sensor system of the camera device 1 may be placed on the associated, flexible circuit board.

Alternatively, a circuit board arrangement having multiple circuit boards that are connected to one another may also be used, said circuit board arrangement replacing the flexible circuit board 13.

It is preferred that the housing 12 is embodied from a non-conductive material, which is also used as a carrier substrate for the flexible circuit board 13. The housing 12 comprises a housing inner face 14 and the circuit board 13 comprises an inner face 23. So as to avoid reflections of the light bundle_B 6, 7, it is possible to provide the housing inner face 14 and also optionally the inner face 23 of the circuit board 13 with a radiation-absorbing layer, by way of example with black solder resist.

The flexible circuit board 13 comprises a bending portion 15.

Moreover, circuit board attachment elements 16, so-called mechanical guiding pins, are provided in order to ensure the flexible circuit board 13 is positioned in the housing 12. The circuit board attachment elements 16 may be embodied by way of example from a light, non-conductive and corrosion-resistant synthetic material. Alternatively, the flexible circuit board 13 may be fixed in the housing 12 by adhesion. The flexible circuit board 13 may also be fixed in the housing 12 by a screw connection and consequently may be rigidly connected to the housing 12. Other attachment methods are also possible.

The first sensor 4 is configured to convert the first light bundle_B 6 that is impinging on the first sensor 4 into first image data of the surroundings and the second sensor 5 is configured to convert the second light bundle_B 7 that is impinging on the second sensor 5 into second image data of the surroundings.

Moreover, the camera device 1 comprises a data transmitting interface 17 and it is possible via said data transmitting interface to transmit the first and the second image data of the surroundings for further processing outside the housing 12. The data transmitting interface 17 may be configured by way of example as an MIPI or POC interface.

Moreover, the camera device 1 may be configured as a camera.

Figure 3:
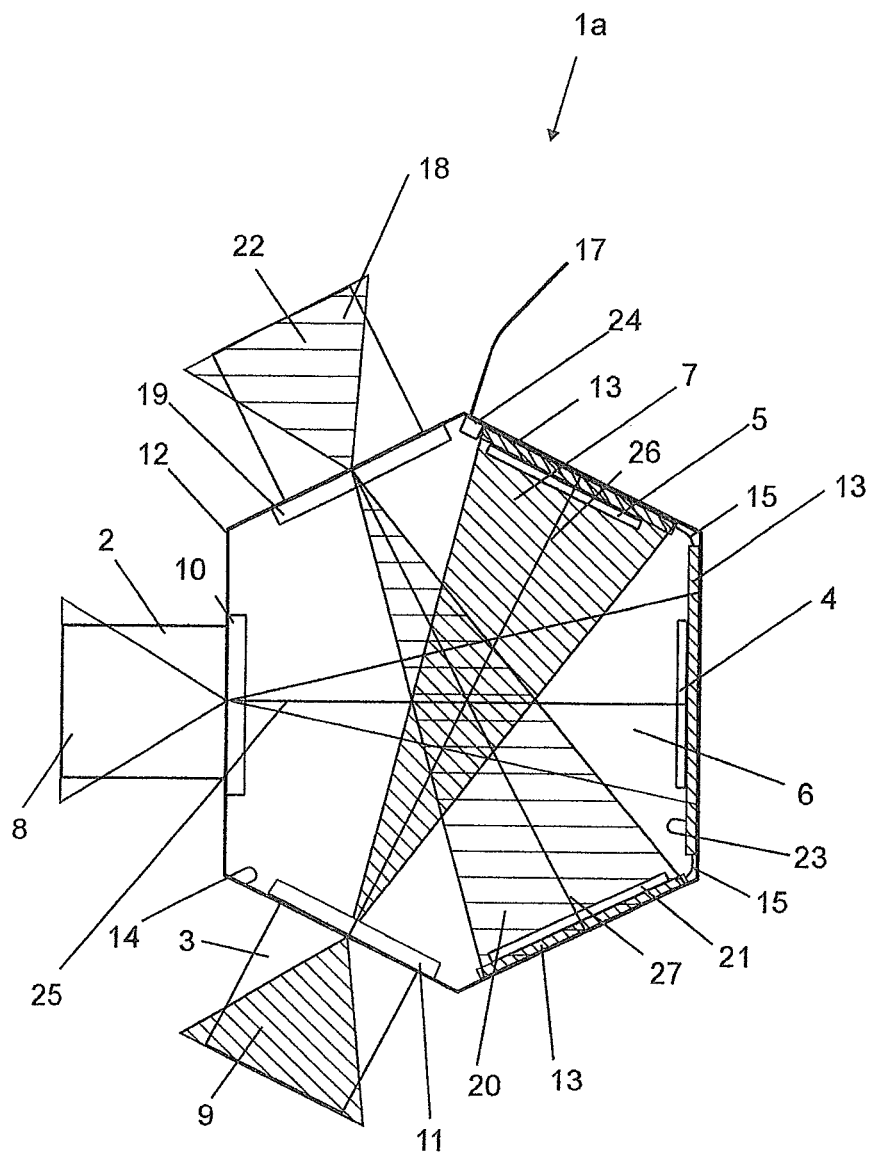
FIG. 3 schematically illustrates a plan view of a second camera device.

FIG. 3 illustrates a further camera device 1a in accordance with the invention. The second camera device 1a likewise comprises the first lens 2, the first filter 10, the first light bundle_B 6 that impinges on the first sensor 4.

The camera device 1a comprises in addition likewise the second lens 3, the second filter 11, the second light bundle_B 7 that impinges on the second sensor 5.

In addition, the camera device 1a comprises a third lens 18, which comprises a third filter 19, a third light bundle_B 20 that impinges on a third sensor 21. The third lens 18 forms together with the third sensor 21 a third optical axis 27.

The first sensor 4, the second sensor 5, and the third sensor 21 are positioned essentially in each case at a 120 degree angle with respect to one another.

The first lens 2 is positioned with respect to the first sensor 4 in such a manner that the first light bundle_B 6 that occurs as a result of the incoming first light bundle_A 8 does not impinge on the second sensor 5 or on the third sensor 21.

The second lens 3 is positioned with respect to the second sensor 5 in such a manner that the second light bundle_B 7 that occurs as a result of an incoming second light bundle_A 9 does not impinge on the first sensor 4 or on the third sensor 21.

The third lens 18 is positioned with respect to the third sensor 21 in such a manner that the third light bundle_B 20 that occurs as a result of an incoming third light bundle_A 22 does not impinge on the first sensor 4 or on the second sensor 5.

The first sensor 4, the second sensor 5, and the third sensor 21 are arranged in the housing 12. The first lens 2, the second lens 3, and the third lens 18 are arranged on the housing 12.

The first optical axis 25, the second optical axis 26, and the third optical axis 27 intersect in the housing 12. The first light bundle_B 6, the second light bundle_B 7, and the third light bundle_B 20 overlap in part in the housing 12.

The first sensor 4, the second sensor 5, and the third sensor 21 are arranged on the flexible circuit board 13. The flexible circuit board 13 comprises bending portions 15.

The first sensor 4 and/or the second sensor 5 and/or the third sensor 21 may be configured as a one-dimensional, two-dimensional, or three-dimensional image sensor.

In addition, an electronic evaluating unit 24 is arranged in the housing 12. The electronic evaluating unit 24 is used so as to pre-process data of the first, the second and the third image data of the surroundings, said image data being generated by the first sensor 4, the second sensor 5, and the third sensor 21. As a consequence, data pre-processing, which is computationally intensive, is now performed at the site where the data is generated. It is likewise possible to reduce the volume of data during the pre-processing procedure. It is also possible to perform a plausibility check and where appropriate correct the data. The electronic evaluating unit 24 is connected to the data transmitting interface 17 so as to transmit the pre-processed image data of the surroundings for further processing outside the housing 12.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A camera device, comprising:
    a first lens configured to form a first light bundle_B in a case of a first light bundle_A passing through the first lens;
    a first sensor arranged within the first light bundle_B and configured to convert the first light bundle_B, which impinges on the first sensor, into first image data of a surroundings;
    at least a second lens configured to form a second light bundle_B in case of a second light bundle_A passing through the at least second lens;
    at least a second sensor arranged within the second light bundle_B and configured to convert the second light bundle_B, which impinges on the at least second sensor, into second image data of the surroundings;
    a common housing in which the first sensor and the at least second sensor are arranged;
    wherein the first sensor is arranged outside the second light bundle_B;
    wherein the at least second sensor is arranged outside the first light bundle_B;
    wherein the first lens and the first sensor and the at least second lens and the at least second sensor are arranged such that the first light bundle_B and the second light bundle_B overlap in a part in the common housing;
    a first optical axis is formed by the first lens together with the first sensor;
    a second optical axis is formed by the at least second lens with the at least second sensor; and
    wherein the first lens, the first sensor, the at least second lens and the at least second sensor are arranged such that the first optical axis and the second optical axis intersect one another within the common housing.

2. The camera device as claimed in claim 1, wherein the first lens and the at least second lens are arranged one of in or on the common housing.

3. The camera device as claimed in claim 1, wherein the first lens faces in a first direction and the at least second lens faces in a second direction that is different than the first direction.

4. The camera device as claimed in claim 1, wherein at least one of the first sensor and the at least second sensor is configured as one of a one-dimensional image sensor, a two-dimensional image sensor, or three-dimensional image sensor.

5. The camera device as claimed in claim 1, wherein at least one of:
    the first sensor is configured as a first semiconductor component comprising multiple photo-sensitive pixels; and
    the at least second sensor is configured as a second semiconductor component comprising multiple photo-sensitive pixels.

6. The camera device as claimed in claim 1, further comprising:
    a flexible circuit board,
    wherein the first sensor and the at least second sensor are arranged on the flexible circuit board.

7. The camera device as claimed in claim 1, further comprising:
    at least one data transmitting interface for transmission of the first image data of the surroundings and of the at least second image data of the surroundings.

8. The camera device as claimed in claim 1, further comprising at least one of:
    a first filter arranged between the first lens and the first sensor and
    a second filter arranged between the at least second lens and the at least second sensor.

9. The camera device as claimed in claim 1, further comprising:
    an electronic evaluating unit provided in the common housing and configured to pre-process the first image data of the surroundings and the at least second image data of the surroundings.

10. The camera device as claimed in claim 1, wherein the first lens and the at least second lens are arranged fixedly in or on the common housing and the first sensor and the at least second sensor are arranged fixedly in the common housing.

11. The camera device as claimed in claim 10, wherein the first lens, the at least second lens, the first sensor and the at least second sensor are arranged in a rigid manner with respect to one another.

12. A driver assist system comprising:
    a camera device, comprising:
        a first lens configured to form a first light bundle_B in a case of a first light bundle_A passing through the first lens;
        a first sensor arranged within the first light bundle_B and configured to convert the first light bundle_B, which impinges on the first sensor, into first image data of a surroundings;
        at least a second lens configured to form a second light bundle_B in case of a second light bundle_A passing through the at least second lens;
        at least a second sensor arranged within the second light bundle_B and configured to convert the second light bundle_B, which impinges on the at least second sensor, into second image data of the surroundings;
        a common housing in which the first sensor and the at least second sensor are arranged;
        wherein the first sensor is arranged outside the second light bundle_B;
        wherein the at least second sensor is arranged outside the first light bundle_B;
        wherein the first lens and the first sensor and the at least second lens and the at least second sensor are arranged such that the first light bundle_B and the second light bundle_B overlap in a part in the common housing;
        a first optical axis is formed by the first lens together with the first sensor;
        a second optical axis is formed by the at least second lens with the at least second sensor; and
        wherein the first lens, the first sensor, the at least second lens and the at least second sensor are arranged such that the first optical axis and the second optical axis intersect one another within the common housing.

13. The driver assist system as claimed in claim 12, further comprising:
- a computer configured to process the first image data of the surroundings and the second image data of the surroundings to form a total image of the surroundings; and
- a display device configured to display the image of the surroundings.

14. A vehicle having a driver assist system comprising:
a camera device, comprising:
- a first lens configured to form a first light bundle_B in a case of a first light bundle_A passing through the first lens;
- a first sensor arranged within the first light bundle_B and configured to convert the first light bundle_B, which impinges on the first sensor, into first image data of a surroundings;
- at least a second lens configured to form a second light bundle_B in case of a second light bundle_A passing through the at least second lens;
- at least a second sensor arranged within the second light bundle_B and configured to convert the second light bundle_B, which impinges on the at least second sensor, into second image data of the surroundings;
- a common housing in which the first sensor and the at least second sensor are arranged;
- wherein the first sensor is arranged outside the second light bundle_B;
- wherein the at least second sensor is arranged outside the first light bundle_B;
- wherein the first lens and the first sensor and the at least second lens and the at least second sensor are arranged such that the first light bundle_B and the second light bundle_B overlap in a part in the common housing;
- a first optical axis is formed by the first lens together with the first sensor;
- a second optical axis is formed by the at least second lens with the at least second sensor; and
- wherein the first lens, the first sensor, the at least second lens and the at least second sensor are arranged such that the first optical axis and the second optical axis intersect one another within the common housing.

15. The camera device as claimed in claim 8, wherein at least one of the first filter and the second filter is configured as an IR (infra-red) filter.

* * * * *